March 13, 1962  H. W. RIMBACH  3,025,423
LAMP, PHOSPHOR AND METHOD
Filed April 4, 1960  3 Sheets-Sheet 1

INVENTOR.
HENRY W. RIMBACH.
BY
W. D. Palmer
ATTORNEY.

INVENTOR.
HENRY W. RIMBACH.
BY W. D. Palmer
ATTORNEY.

March 13, 1962 H. W. RIMBACH 3,025,423
LAMP, PHOSPHOR AND METHOD
Filed April 4, 1960 3 Sheets-Sheet 3

INVENTOR.
HENRY W. RIMBACH.
BY
W. D. Palmer
ATTORNEY.

United States Patent Office 3,025,423
Patented Mar. 13, 1962

3,025,423
LAMP, PHOSPHOR AND METHOD
Henry W. Rimbach, Cedar Grove, N.J., assignor to Westinghouse Electric Corporation, East Pittsburgh, Pa., a corporation of Pennsylvania
Filed Apr. 4, 1960, Ser. No. 16,628
33 Claims. (Cl. 313—108)

This invention relates to phosphor material, method and discharge devices and, more particularly, to novel phosphor material, a method of making same and a discharge device utilizing phosphor material. This application is a continuation-in-part of application S.N. 810,844, filed May 4, 1959, now abandoned, titled "Lamp, Phosphor and Method" by Henry W. Rimbach.

Most so-called photoluminescent phosphor materials operate efficiently at relatively low temperatures to convert ultraviolet radiations into visible radiations. At relatively high temperatures, however, the efficiency of most phosphor material drops off rapidly. A few phosphors operate efficiently at moderately high temperatures (phosphors having so-called good temperature-dependence characteristics) and are used extensively in conjunction with high-pressure, mercury-vapor (HPMV) lamps. The light which is generated by the arc tube discharge source of such lamps is primarily emitted as closely spaced yellow lines and a green line, which the eye blends together to produce a greenish-yellow light. While the color of this light is not displeasing, the color rendition of objects illuminated by such light is not as good as desired. It has been disclosed in U.S. Patent No. 2,748,303, dated May 29, 1956 to Thorington, to color correct an HPMV lamp by placing phosphor material on the inner surface of the outer envelope which surrounds the arc tube discharge source. In accordance with this patent to Thorington, the phosphor material converts ultraviolet radiations generated by the arc tube into red radiations, in order to color correct the output of the lamp and to improve the color rendition of objects which are illuminated by the lamp. To date the emission colors of commercially-available phosphors which have good temperature-dependence characteristics have been limited to the red and the yellow orange. It is desirable to provide other phosphor materials for color correcting the output of such discharge devices. It is also desired to increase the overall output of such HPMV devices while still obtaining different degrees of color correction.

For some applications, it is desirable to keep the effective light-emitting portion of an HPMV lamp as small as possible, such as where this type of lamp is utilized in conjunction with a reflecting member. In the usual color-corrected HPMV lamp, the phosphor coated outer envelope, which approximates optimum size for best phosphor output, appears as a part of the light source to any lens and reflector arrangement. This relatively-large light source decreases the optical efficiency of the usual lens and reflector system.

It is the general object of this invention to avoid and overcome the foregoing and other difficulties of and objections to prior-art practices by the provision of novel phosphor material having excellent temperature-dependence characteristics.

It is another object to provide a method for making phosphor material having excellent temperature-dependence characteristics.

It is a further object to provide phosphor material which has excellent high-temperature performance characteristics and emission colors varying from green to red.

It is an additional object to provide phosphor material which has a line emission spectrum and very good luminosity efficiency, especially at elevated temperatures.

It is yet another object to provide phosphor material having excellent temperature-dependence characteristics and an efficient output in the longer wavelength region of the visible spectrum.

It is still another object to provide a high-pressure, mercury-vapor lamp having increased output as well as some color correction.

It is a further object to provide a color-corrected, high-pressure, mercury-vapor lamp having a smaller effective light source and increased output.

The aforesaid objects of the invention, and other objects which will become apparent as the description proceeds, are achieved by providing a novel phosphate phosphor material and a method of making same. More specifically, the phosphor material is a tertiary orthophosphate phosphor which principally comprises a phosphate of strontium, calcium or barium or mixtures of two or more thereof with a predetermined additive amount of phosphate of terbium, yttrium, gadolinium, lutecium, ytterbium or mixtures thereof and a phosphor activator comprising copper, tin or mixtures thereof, with or without manganese. Such phosphor is particularly adapted for use with an HPMV lamp. Also provided is an improved high-pressure, mercury-vapor lamp which utilizes the present phosphor in conjunction with phosphor-coated member positioned intermediate the arc tube discharge source and the outer envelope, in order to reduce the size of the effective light source for the color-corrected lamp and to increase the output of the lamp.

For a better understanding of the invention, reference should be had to the accompanying drawings wherein.

While the phosphor of this invention has particular utility with respect to high-pressure, mercury-vapor lamps and is specifically so described herein, it should be understood that the present phosphor material may also be used for any application where it is desired to convert ultraviolet radiations into visible radiations, such as a standard fluorescent lamp.

Figure 1:
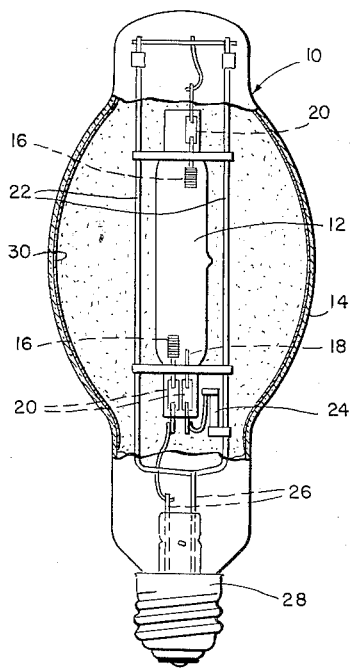
FIG. 1 is an elevational view, partly in section, of a high-pressure, mercury-vapor lamp which incorporates phosphor of this invention.

With specific reference to the form of the invention illustrated in the drawings, the numeral 10 in FIG. 1 illustrates generally a high-pressure, mercury-vapor lamp comprising an inner arc tube 12 which is surrounded by a vitreous, light-transmitting outer envelope 14. The construction of the inner arc tube 12, which can be fabricated of quartz for example, is conventional and includes main electrodes 16 operatively disposed at either end thereof, a starting electrode 18 positioned proximate one of the main electrodes 16 and ribbon conductors 20 sealed through either end of the arc tube 12. The arc tube 12 is suitably supported within the outer envelope 14 by a conventional supporting frame 22 and a starting resistor 24 is used to connect the starting electrode 18 to one side of the energizing potential, as is usual. Lead conductors 26 supply power to the arc tube 12 and are electrically connected to a conventional screw-type base 28. The inner surface of the envelope 14 carries thereon a coating 30 of the present phosphor.

Figure 2:
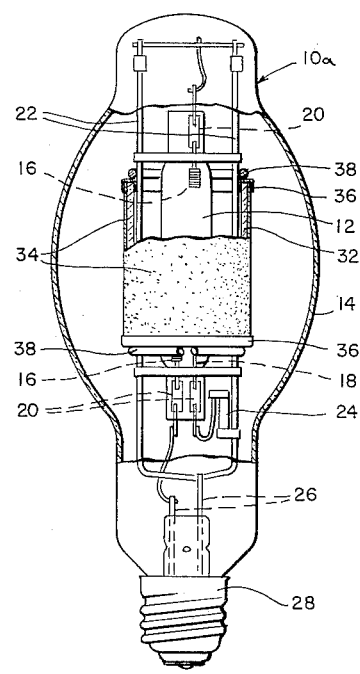
FIG. 2 is an elevational view, partly in section, of a high-pressure, mercury-vapor lamp which is provided with a phosphor-coated member positioned intermediate the arc tube and the outer envelope.

The lamp 10a as shown in FIG. 2 corresponds to the lamp 10 as shown in FIG. 1 except that coating 30 is replaced by an additional coated light-transmitting, sleeve-like, cylindrical member 32, which can be fabricated of quartz for example, supported by the frame 22 intermediate the arc tube source 12 and the outer envelope 14. For a 400 watt lamp, the member 32 can have an outer diameter of 54 mm. As an example, a copper-activated strontium-terbium phosphate embodiment of the present phosphor is carried as a coating 34 on the member 32, desirably on the outer surface thereof. The member 32 is supported in position on the frame 22 by means of channel supports 36 and retaining rings 38 welded to the frame 22. As an alternative embodiment, a plurality of small phosphor-coated members can be used to replace the single member 32 as shown. The positioning of the member 32 intermediate the arc tube 12 and the outer envelope 14 serves to cause the coated phosphor 34 to operate at a predetermined elevated temperature in the order of about 430° C. so that it converts ultraviolet radiations generated by the arc tube source into visible radiations in a very efficient manner. In many cases it is not practical to reduce the size of the outer envelope to increase the temperature at which the phosphor operates, inasmuch as this has a tendency to cause such smaller envelope to give off some hydrogen, which in turn has a deleterious effect on the operation of the arc tube 12. By using the smaller phosphor-coated member 32, the outer envelope 14 can be maintained at its normal temperature, while increasing somewhat the temperature at which the phosphor operates and decreasing the effective size of the light source.

The phosphor of this invention comprises phosphate in generally tertiary orthophosphoric proportions and incorporates as essential metallic elements: strontium, barium, calcium or mixtures thereof in predetermined proportions as a major component; terbium, yttrium, lutecium, ytterbium, gadolinium, or mixtures thereof in predetermined additive proportions as a minor component; and copper, tin or mixtures thereof in predetermined activator proportions. The further addition of manganese as an activator can be utilized in order to shift the phosphor emission spectrum. The phosphor raw mix comprising, for example, the respective metal components and phosphate, is fired in an atmosphere which is at most mildly reactive and desirably is slightly reducing and slightly moist. Numerous examples of the foregoing phosphors which incorporate individual rare earth metals or yttrium will be separately considered in detail hereinafter.

STRONTIUM-TERBIUM PHOSPHATE

Figure 3:
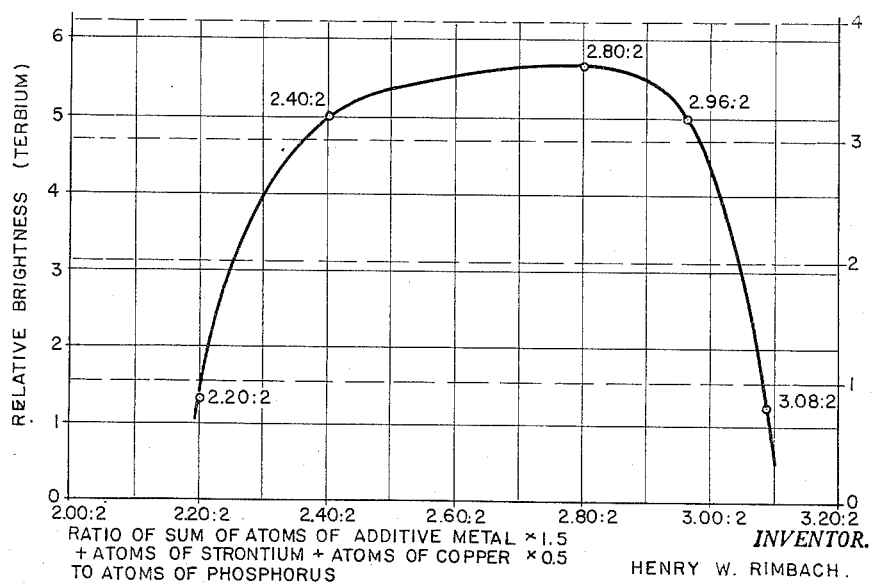
FIG. 3 is a graph of relative brightness versus the ratio of the sum of atoms of additive metal times 1.5 plus atoms of strontium plus atoms of copper times 0.5 to atoms of phosphorus in the present phosphor.
Figure 4:
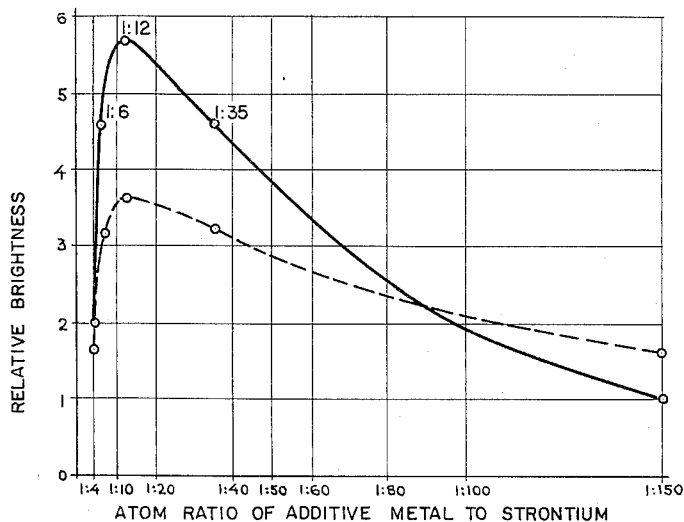
FIG. 4 is a graph of relative brightness versus the ratio of atoms of additive metal to atoms of strontium in the present phosphor.
Figure 5:
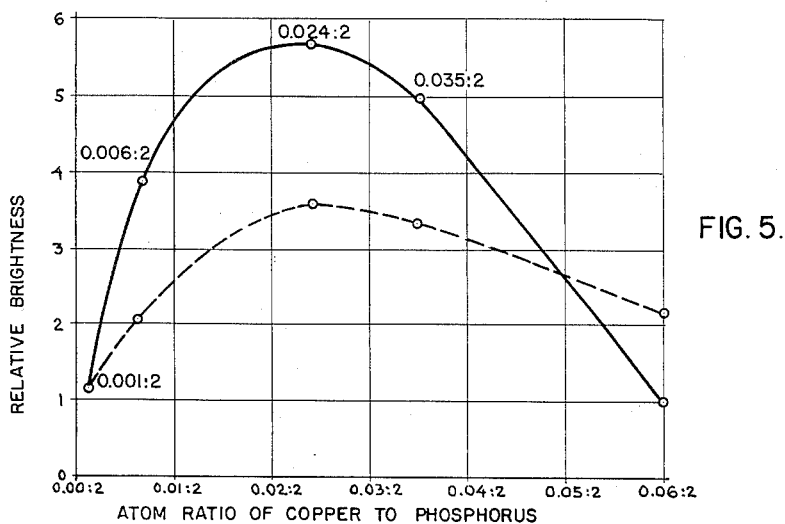
FIG. 5 is a graph of relative brightness versus the ratio of atoms of copper to atoms of phosphorus for a preferred embodiment of the present phosphor.

The preferred embodiment of this indicated phosphor includes strontium as the principal metallic constituent, terbium as the minor metallic constituent and copper as activator. The strontium can be replaced in part or in whole by calcium, barium or any mixtures thereof in varying proportions and the copper activator can be replaced in part or in whole by a tin activator. If desired, manganese activator can be incorporated in order to shift the phosphor emission spectrum. The curves as illustrated in FIGS. 3 through 5 show the effects of compositional variation on brightness performance characteristics for the preferred strontium-terbium phosphor activated by copper. The phosphor excitation source used in carrying out the tests on which are based the curves shown in FIGS. 3 through 5 and all performance curves shown herein was an HPMV arc through a Corning No. 7–54 filter. All brightness values are expressed in arbitrary units and were measured with an eye-sensitivity-corrected photocell. These curves are based on data taken with the phosphor maintained at a temperature of about 275° C., except where otherwise noted, since this temperature is fairly representative of operating conditions for a phosphor which is coated onto the inner surface of the outer envelope of an HPMV lamp, as illustrated in FIG. 1.

In FIG. 3 is shown a graph based on tests of a series of phosphors plotting relative brightness versus the sum of atoms of terbium additive metal times 1.5 plus atoms of strontium plus atoms of copper times 0.5 to atoms of phosphorus in the phosphor $(Tb \times 1.5 + Sr + Cu \times 0.5)/P$. The phosphor essentially is a tertiary orthophosphate although a slight excess of $P_2O_5$ is desired over that amount which is normally considered as stoichiometric. The atoms of terbium as expressed in this curve are weighted with the factor of 1.5 inasmuch as terbium is incorporated into the present phosphor as a tripositive metal. If the terbium atoms were not weighted with the factor of 1.5, but were only expressed in atom or gram-atom proportions, the curve of brightness versus the atom ratio of the sum of indicated metals to phosphorus would not present as accurate and meaningful a representation of the properties of the phosphor. Similarly the copper in the phosphor is weighted with a factor of 0.5 since copper apparently is present in the cuprous state because of the phosphor firing conditions. While the copper is included in the presentation of the performance curve as shown in FIG. 3, the curve would be substantially the same if copper were not included in the computation since copper is present in only the very small amounts normally referred to as activator proportions. For a definition of "activator" reference is made to Leverenz, "An Introduction to Luminescence of Solids," Wiley & Sons, New York (1950), page 64. To obtain a reasonable brightness, the ratio of the sum of atoms of terbium times 1.5 plus atoms of strontium plus atoms of copper times 0.5 to atoms of phosphorus in the phosphor is from 2.2:2 to 3.08:2. Preferably this ratio is from 2.4:2 to 2.96:2 and for optimum brightness, this ratio is about 2.8:2. As shown, this curve has a broad peak. In taking the data supporting the curve as shown in FIG. 3, the phosphors were so prepared that the atom ratio of terbium to strontium in the phosphor and the atom ratio of copper to phosphorus in the phosphor were maintained at approximately optimum.

In FIG. 4 is shown as a solid curve the effect on brightness with respect to varying the ratio of atoms of terbium as additive metal to atoms of strontium in the phosphor. In taking the data supporting this curve, the other phosphor constituent variables were maintained at about optimum. For reasonable brightness, that is a relative brightness of at least "one," this ratio is from 1:4 to 1:150 and preferably this ratio is from 1:6 to 1:35. Optimum performance is realized when the ratio of atoms of terbium to atoms of strontium in the phosphor is about 1:12. For values approaching this optimum ratio, the brightness of the resulting phosphor varies only moderately, as evident from FIG. 4. The broadest phosphor constituent ratios will be referred to herein as permissible constituent ratios.

In FIG. 5 is shown as a solid curve the effect of variations in copper concentration on relative brightness, wherein relative brightness is plotted versus the ratio of atoms of copper to atoms of phosphorus in the phosphor. To obtain reasonable brightness, this ratio is from 0.001:2 to 0.06:2 and preferably this ratio is from 0.006:2 to 0.035:2. For best results, this ratio is about 0.024:2. For values approaching this optimum, the phosphor brightness varies only slightly. In taking the data supporting this curve, the ratio of atoms of total metal to atoms of phosphorus and the atom ratio of terbium to strontium were maintained at approximately optimum. The copper when present in higher concentrations introduces some tendency for discoloration and accordingly the preferred upper limit is 0.035:2. This discoloration is objectionable as it is indicative of absorption characteristics in the visible region of the spectrum. For this reason, it is desirable to use as small amount of copper as possible, commensurate with good brightness.

The curves as shown in FIGS. 3 through 5 depict the properties of the preferred strontium-including phosphor embodiment and curves of the same general shape would be obtained if calcium or barium or mixtures thereof were substituted in part or in whole in equivalent gram-atom amount for the strontium. The brightness of the calcium-including embodiment is decreased slightly from the brightness obtainable with the strontium-including embodiment and the "line spectrum" as described hereinafter is altered slightly. The brightness of the barium-including embodiment is decreased still more.

The foregoing alkaline-earth plus terbium orthophosphoric phosphor can also be activated solely by tin, although copper is preferred. In the case of tin activation, the activator concentration desirably is such that the ratio of sum of the total atoms of tin or tin plus atoms of copper to atoms of phosphorus in the phosphor is from 0.001:2 to 0.10:2, with the atom ratio of copper to phosphorus not exceeding 0.06:2. Optimum tin concentration is approximately the same as optimum copper activator concentration. The phosphor can also include manganese as additional activator to supplement the primary copper, tin or copper-tin activator as used in accordance with the foregoing ranges. Manganese can be used in greater relative gram-atom proportions than the copper or tin. In the case a manganese additional activator is desired it can be used in from trace amounts (such as a ratio of atoms of manganese to atoms of phosphorus of 0.0001:2) up to such amount that this ratio is 0.16:2. At the higher manganese concentrations, the total gram atoms of other metal in the phosphor should be decreased slightly in order to maintain a ratio of total effective positive valence bonds for the total atoms of metal in the phosphor times 0.5 to total atoms of phosphorus in the phosphor of from 2.2:2 to 3.08:2.

Summarizing the present phosphor composition, it is a phosphate of generally tertiary orthophosphate proportions and includes as essential metallic elements: copper, tin or mixtures thereof as activator; barium, calcium, strontium or mixtures thereof as the principal metallic constituent and terbium in additive proportions. Additive of manganese as an activator can be used if desired. In this phosphor, the ratio of the sum of atoms of terbium times 1.5 plus number of atoms of the indicated alkaline-earth metal plus atoms of copper times 0.5 plus atoms of tin, if used, plus atoms of manganese, if used, to the atoms of phosphorus in the phosphor permissibly is from 2.2:2 to 3.08:2, preferably from 2.4:2 to 2.96:2 and for optimum brightness is about 2.8:2. As indicated hereinbefore, this ratio is also expressible as the number of total effective positive valence bonds for total metal times 0.5 divided by total atoms of phosphorus in the phosphor. The ratio of the atoms of terbium to the atoms of alkaline-earth metal in the phosphor is permissibly from 1:4 to 1:150, preferably from 1:6 to 1:35 and for optimum performance is about 1:12. The ratio of atoms of copper to atoms of phosphorus in the phosphor is permissibly from 0.001:2 to 0.06:2, preferably from 0.006:2 to 0.035:2 and for optimum performance is about 0.024:2. If tin is used either to replace a part or all of the copper, the ratio of atoms of tin or tin plus copper to atoms of phosphorus in the phosphor is from 0.001:2 to 0.10:2, with the ratio of the atoms of copper to atoms of phosphorus in the phosphor not exceeding 0.06:2 because of discoloration effects. As shown in FIGS. 3 through 5, even the broadest of the foregoing ranges can be extended.

The terbium-including phosphor can also be represented by formula as follows:

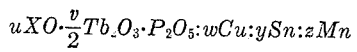

$$uXO \cdot \frac{v}{2} Tb_2O_3 \cdot P_2O_5 : wCu : ySn : zMn$$

wherein: "X" is strontium, calcium, barium or any mixture thereof with strontium being preferred; "u" has a value of from $4v$ to $150v$; "w" has a value of from 0 to 0.06; "y" has a value of from 0 to 0.10, with "w" plus "y" being from 0.001 to 0.10; "z" has a value of from 0 to 0.16; "w" plus "z" does not exceed 0.22; "y" plus "z" does not exceed 0.26; and "u" plus "v" times 1.5 plus "w" times 0.5 plus "y" plus "z" is from 2.2 to 3.08. Preferred and optimum values for "u," "v," "w," "y" and "z" as established by the foregoing phosphor constituent ranges can be substituted into this formula.

Following is a specific example for preparing the copper-activated strontium-terbium phosphate phosphor.

Example 1

| Raw-mix constituent: | Amount grams |
|---|---|
| SrHPO$_4$ (38.6% P$_2$O$_5$—56% SrO) | 367.6 |
| SrCO$_3$ | 72.6 |
| Tb$_4$O$_7$ | 38.65 |
| Copper carbonate (56% Cu) | 2.84 |

The foregoing raw-mix constituents are thoroughly mixed and are fired at a temperature of about 1350° C. for about one-half hour. The firing temperature and time can be varied and are not critical, although temperatures appreciably higher than about 1400° C. will result in an excessively-hard phosphor which is difficult to reduce to a finely-divided status suitable for coating. Temperatures appreciably lower than about 1250° C. will result in a phosphor which has somewhat reduced brightness.

The phosphor firing atmosphere desirably is at most mildly reactive in that it desirably is either slightly reducing, inert or slightly oxidizing in nature. The brightest phosphors are obtained with a slightly-reducing firing atmosphere which comprises an inert gas such as nitrogen, helium or argon having added thereto some hydrogen and a small amount of moisture, for instance, corresponding to a dew-point of as low as 10° C. to as high as 60° C. The fired phosphor desirably is cooled in the same or a similar atmosphere. As an example, the firing atmosphere has a dew-point of 22° C. and comprises nitrogen mixed with from 0.5% to 10% and preferably from 1% to 4% by volume of hydrogen. The moisture can be varied considerably and other inert gases can be substituted in whole or in part for the nitrogen. However, phosphors which respond well to both short-wave and longwave ultraviolet excitation can be obtained with a firing atmosphere which consists of an inert gas containing a small amount of moisture, a firing atmosphere consisting of a dry (less than −20° C. dew-point) inert gas alone or a firing atmosphere consisting of a dry inert gas and a small amount of hydrogen. While the hydrogen in the foregoing proportions is slightly reducing in nature, the moisture supplies a slightly-oxidizing effect to the atmosphere. If the phosphor raw mix is fired solely in air, the luminescence under 3650 A.U. excitation is quite good, but the luminescence under 2537 A.U. excitation is poor. In view of this, the effect of the firing atmosphere which is at most mildly reactive, is deemed to cause at least a part of the copper, or tin if used, to be present in the cuprous and stannous states respectively. Similarly, manganese if used is considered to be present at least in part in the divalent state.

In the foregoing Example I, calcium or barium acid phosphate and carbonate or any mixtures thereof can be substituted either in part or in whole for the strontium compounds, maintaining the gram-atom ratios of the phosphor constituents the same. In the case of a calcium-terbium phosphate, the preferred firing temperature is 1325° C. In the case of a barium-terbium phosphate, the preferred firing temperature is 1300° C. The other firing conditions are the same as given under Example I hereinbefore. As a possible alternative embodiment, the raw mix for the present phosphor can be pre-fired in air and thereafter fired in the slightly-reducing atmosphere in the manner as indicated hereinbefore. A double-firing technique has been found to be beneficial in some cases. Such a double-firing involves repeating the foregoing single firing step, preferably with an intervening milling, and apparently this tends to react more completely the phosphor raw mix constituents to improve the performance slightly. Other phosphor raw-mix constituents can be substituted for those as given in the foregoing Example I.

If the strontium-terbium phosphate is to be activated only by tin, 4.04 grams of stannous oxide can be substituted for the copper carbonate in Example I. Alternatively, copper and tin compounds can be mixed in amount of 1.70 grams copper carbonate and 4.04 grams stannous oxide and substituted for the copper carbonate in the foregoing Example I. In addition, manganese as manganous carbonate (45.1% Mn), in amount of 2.44 grams for example, can be added to the raw-mix constituents of Example I or to any of the alternative raw-mix compositions as specified hereinbefore. Phosphor raw mixes as required to produce phosphors falling within the constituent ranges as specified hereinbefore can be readily calculated by varying the phosphorus and metal constituents in the raw mix in accordance with these ranges. As an example, if 93.7 grams strontium carbonate and 40.9 grams terbium oxide are substituted in place of the amounts of the corresponding materials as given in Example I, the total metal to phosphorus atom ratio, as per FIG. 3, will be 2.96:2.

Figure 6:
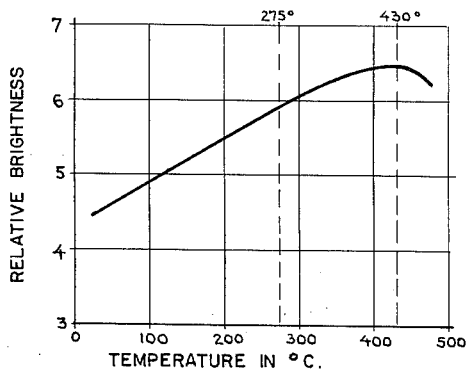
FIG. 6 is a curve of relative brightness versus temperature illustrating the temperature-dependence characteristics for one best embodiment of the present phosphor.

The temperature-dependence characteristics for the copper-activated terbium-including phosphor are the best ever observed to date for any phosphor material. In FIG. 6 is shown a curve of relative brightness versus temperature for the preferred strontium-including embodiment of this phosphor. With available equipment, the maximum temperature at which the phosphor could be maintained while measuring its brightness was 475° C. As shown in FIG. 6, maximum brightness occurs at a temperature of about 430° C. The spectral distribution of the present phosphor does not shift, at least to any noticeable degree, as the phosphor is heated to higher temperatures and this is contrary to the results observed with nearly all other phosphor materials.

Figure 7:
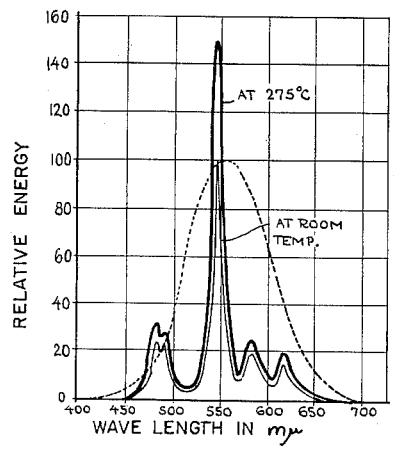
FIG. 7 illustrates spectral distribution curves taken at two different temperatures for one best embodiment of the present phosphor, with the eye-sensitivity curve superimposed thereover.

Phosphor materials normally display what is known as a band spectral emission, that is, the emission spectrum extends continuously over a considerable range of wavelengths. When the line spectrum of the HPMV lamp is color corrected by superimposing thereover a continuous spectral band which extends over a considerable range of wavelengths, the resultant emission of the color-corrected HPMV lamp is still quite rich in the yellow and green lines as emitted by the arc tube source, since the light emission in these lines is also supplemented by the emission of similar color from the color-correcting phosphor material. The present copper-activated terbium-including phosphor is most unusual in that it has a line spectral emission. In FIG. 7 are shown spectral distribution curves taken when the phosphor was at room temperature and at a temperature of 275° C. for the preferred copper-activated strontium-including embodiment. The curve taken at room temperature is shown as a light line and the curve taken at 275° C. is shown as a heavy line. The eye-sensitivity curve is shown as a broken line for purposes of comparison. The room-temperature curve is normalized to a value of 100 and a curve of relative intensity for the phosphor emission at 275° C. is ploted with respect to the room-temperature curve. While the light emission of the phosphor is shown as peaking at approximately 545 mu, this peak actually constitutes two distinct lines which are positioned on either side of the green line which is emitted by an HPMV arc tube. This can be observed through a spectroscope with a narrowed slit. The present phosphor also emits some line-emission energy in the blue green, the yellow orange and the red orange. When the curves as shown in FIG. 7 are corrected for eye-sensitivity response, a considerable portion of the blue-green radiations will be effectively lost as will the red-orange radiations. This is readily seen by comparing the emission spectrum curves with the eye-sensitivity curve. However, nearly all of the green radiations and a considerable portion of the yellow-orange radiations emitted by the phosphor will provide useful illumination. Thus the present phosphor is most unusual in that a substantial portion of its energy is concentrated almost to coincide with the peak of the eye-sensitivity curve. This most-unusual line spectral emission coupled with the excellent temperature-dependence characteristics of the present phosphor make it particularly adapted for use with HPMV lamps.

When the terbium-including phosphate phosphor is activated only by tin, the emission spectrum is a band or continuous-type spectrum as is normally encountered with the usual phosphor. Apparently the combination of copper activator and terbium additive phosphate function together to produce the line emission spectrum described hereinbefore. If copper and tin activators are mixed within the foregoing indicated proportions, the phosphor still exhibits a line emission spectrum, but the line spectrum is reduced in intensity and has superimposed thereover the continuous spectrum which characterizes the tin activator. If manganese is added as additional activator to the primary activators, the phosphor exhibits an additional continuous spectrum in the orange to red region. When trace amounts of manganese are used, the added continuous spectrum is barely detectable. The greater the manganese addition to the phosphor, however, the more reduced the line spectrum of the copper activator or the continuous spectrum of the tin activator and the stronger the longwave emission of the additional or supplementary manganese activator. For the terbium-including phosphor, maximum brightness is obtained when the preferred copper activator is used alone and the performance curves for such a phosphor have been shown. The temperature-dependence characteristics for the tin-activated or manganese-including phosphor embodiments are good, but not as outstanding as those of the preferred copper-activated embodiment.

STRONTIUM-YTTRIUM PHOSPHATE

Figure 8:
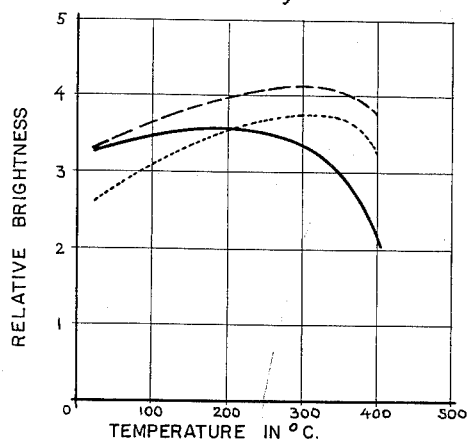
FIG. 8 is a graph of relative brightness versus temperature illustrating the modified performance characteristics realized with varying amounts of additional manganese activator added to a phosphor embodiment of the present invention.

This phosphor is similar to the strontium-terbium phosphor as described hereinbefore with respect to all constituent ranges except that yttrium as additive metal is substituted for terbium. The high-temperature performance of the yttrium-including phosphor is best, however, when the primary copper activator is supplemented by additional manganese activator and the effect of such additional activator is shown in FIG. 8. The solid curve in this figure represents the performance of a strontium-yttrium phosphate phosphor wherein the ratio of atoms of copper to atoms of phosphorus is about 0.024:2, the ratio of the sum of atoms of yttrium times 1.5 plus atoms of strontium plus atoms of copper times 0.5 to atoms of phosphorus is about 2.8:2 and the ratio of atoms of yttrium to atoms of strontium is about 1:12. This phosphor has a maximum output of approximately 3.5 arbitrary brightness units and the brightness peak occurs at a temperature of approximately 180° C. When this same phosphor has added thereto manganese in such amount that the ratio of atoms of manganese to atoms of phosphorus is about 0.02:2, the performance of the phosphor is improved, as shown in the dashed curve in FIG. 8 wherein the maximum output is 4.2 arbitrary brightness units and occurs at a temperature of about 290° C. A further increase in manganese concentration increases the red-orange emission somewhat, thereby decreasing the output. In the dotted curve shown in FIG. 8 is illustrated the performance of a generally-similar phosphor which incorporates manganese additional activator in such concentration that the ratio of atoms of manganese to atoms of phosphorus is about 0.04:2.

Figure 9:
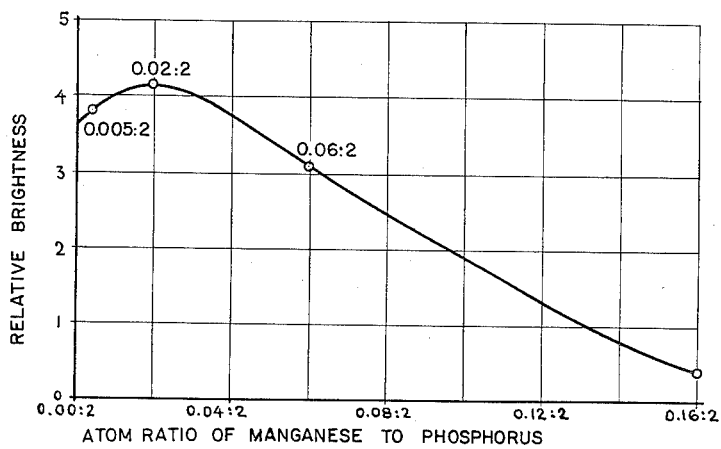
FIG. 9 is a graph of relative brightness versus additional manganese activator concentration for a phosphor embodiment of the present invention, with the manganese concentration expressed as a ratio of atoms of manganese to atoms of phosphorus.

The preferred strontium-yttrium phosphate activated by copper, with or without a small addition of manganese as specified, displays a continuous or band spectrum, as contrasted to the line emission spectrum of the terbium-including embodiment. If no additional manganese activator is included, the emission spectrum under excitation by a full arc appears yellow-green to the eye. As viewed through a spectroscope, this is a continuous band varying from blue to orange. The manganese additional activator introduces therein a red-orange-appearing continuous band and the greater the manganese addition, the more suppressed the shorter wavelength band and the stronger the longer wavelength band. The effect of this is shown in FIG. 9 wherein the copper-activated strontium-yttrium phosphate phosphor has added thereto increasing amounts of manganese additional activator. It should be pointed out that a large portion of the decrease in brightness which is realized with increasing manganese concentration is due to the fact that the eye is relatively insensitive to the longer wavelength emission. Such longer wavelength emission may be desirable for some applications in spite of the decreased brightness, such as when a red-appearing phosphor is desired. Above a concentration of 0.16 atom of manganese per 2 atoms of phosphorus in the phosphor, the resulting brightness is quite poor. Preferably the manganese additional activator is used in such amounts that the ratio of atoms of manganese to atoms of phosphorus in the phosphor is from 0.005:2 to 0.06:2. For maximum brightness at elevated temperatures, this ratio is about 0.02:2 and the temperature-dependence characteristics of this phosphor are very good. While maximum output is realized at a temperature of about 290° C., the output is decreased only about ten percent at a temperature of about 400° C.

Following is a specific example for preparing the copper-activated strontium-yttrium phosphate phosphor having additional manganese activator.

*Example II*

| Raw-mix constituent: | Amount, grams |
|---|---|
| SrHPO$_4$ (38.6% P$_2$O$_5$—56% SrO) | 367.6 |
| SrCO$_3$ | 72.6 |
| Y$_2$O$_3$ | 23.32 |
| Copper carbonate (56% Cu) | 2.84 |
| Manganous carbontae (45.1% Mn) | 2.44 |

The foregoing raw-mix constituents are fired under the same conditions as the terbium-including embodiment except that the preferred firing temperature is about 1325° C. This firing temperature can be varied considerably if desired as in the case of the terbium-including embodiment.

All other embodiments of the yttrium-including phosphor can be compounded to correspond to the terbium-including embodiment, including permissible, preferred and optimum constituent ranges, the substitution of other specified alkaline earth metals for the preferred strontium, the use of the specified amount of tin activator to replace the copper, either in part or in whole, and the use of manganese additional activator with the primary tin, copper or tin-copper activators. In FIGS. 4 and 5, the dashed curves illustrate the effects of compositional variations on brightness for the phosphor incorporating yttrium as additive metal and copper as activator. In FIG. 3 the relative brightness of the copper-activated phosphor incorporating yttrium as additive metal is shown on the right-hand ordinate. As further specific examples, 4.04 grams of stannous oxide can be substituted for the copper carbonate in the foregoing Example II or copper and tin compounds can be mixed in amount of 1.70 grams copper carbonate and 4.04 grams stannous oxide and substituted for the copper carbonate in Example II. In any of these embodiments, the manganese carbonate can be eliminated if desired. Also, calcium or barium acid phosphate and carbonate or any mixtures thereof can be substituted either in part or in whole for the strontium compounds listed under Example II, maintaining the gram-atoms ratios of the phosphor raw-mix constituents the same. When the manganese additional activator is used, it is considered in calculating the metal to phosphorus ratios in the phosphor, as in the case of the terbium-including phosphor. By way of further example, if 61.3 grams strontium carbonate, 22.6 grams yttrium oxide and 1.7 grams copper carbonate are substituted in place of the amounts of the corresponding materials as given in Example II and manganous carbonate not included, the total metal to phosphorus atom ratio, as per FIG. 3, will be 2.71:2 and the atom ratio of copper to phosphorus will be 0.015:2.

STRONTIUM-GADOLINIUM PHOSPHATE

This phosphor is similar to the previous strontium-terbium and strontium-yttrium phosphor with respect to permissible, preferred and optimum constituent ranges except that gadolinium is substituted atom for atom for terbium or yttrium. The high-temperature performance of the gadolinium-including phosphor is best when the primary copper activator is supplemented by additional manganese activator, as in the case of the yttrium-including phosphor. When the phosphor is activated only by copper with no additional manganese activator, the phosphor exhibits an emission under excitation by a full arc which appears yellow to the eye and as viewed through a spectroscope, the emission is a continuous band extending from green to red. Increasing amounts of additional manganese activator shift the resulting emission spectrum toward the longer wavelengths, as in the case of the yttrium-including phosphor. The output performance and temperature-dependence characteristics are comparable to the yttrium-including phosphor.

Following is a specific example for preparing the copper-activated strontium-gadolinium phosphate phosphor having additional manganese activator.

*Example III*

| Raw-mix constituent: | Amount, grams |
|---|---|
| SrHPO$_4$ (38.6% P$_2$O$_5$—56% SrO) | 367.6 |
| SrCO$_3$ | 72.6 |
| Gd$_2$O$_3$ | 37.35 |
| Copper carbonate (56% Cu) | 2.84 |
| Manganous carbonate (45.1% Mn) | 2.44 |

The foregoing raw-mix constituents are fired under the same conditions as the yttrium-including phosphor described hereinbefore and the firing temperatures can be varied considerably if desired, similar to the previous phosphors as described.

All other embodiments of the gadolinium-including phosphor can be compounded to correspond to the yttrium-including phosphor, including the substitution of other specified alkaline-earth metals for the preferred strontium, the use of the specified amounts of tin activator to replace the copper, either in part or in whole, and the use of the manganese additional activator with the primary tin, copper or tin-copper activators. The curve in FIG. 3 and the dashed curves in FIGS. 4 and 5 establish the phosphor constituent ranges. As further specific examples, 4.04 grams of stannous oxide can be substituted for the copper carbonate in the foregoing Example III or copper and tin compounds can be mixed in amount of 1.70 grams copper carbonate and 4.04 grams stannous oxide and substituted for the copper carbonate in Example III. In any of these embodiments, the manganous carbonate can be eliminated if desired. Also, calcium or barium acid phosphate and carbonate or any mixtures thereof can be substituted either in any part or in whole for the corresponding strontium compounds listed under Example III, maintaining the gram-atom ratios of the phosphor raw-mix constituents the same. By way of further example, if 61.3 grams strontium carbonate, 36.2 grams gadolinium oxide and 1.7 grams copper carbonate are substituted in place of the amounts of the corresponding materials as given in Example III and the manganous carbonate not included, the total metal to phosphorus atom ratio, as per FIG. 3, will be 2.71:2 and the atom ratio of copper to phosphorus will be 0.015:2.

STRONTIUM-LUTECIUM PHOSPHATE

This phosphor is similar to the previous yttrium- and gadolinium-including phosphors with respect to permissible, preferred and optimum constituent ranges except that lutecium is substituted for gadolinium for example. The performance of the lutecium-including phosphor is best when the primary copper activator is supplemented by additional manganese activator. When the phosphor is activated only by copper with no additional manganese activator, the phosphor exhibits an emission under excitation by a full arc which appears green to the eye and as viewed through a spectroscope, the emission is a continuous band extending from blue-green to orange. Increasing amounts of additional manganese activator shift the resulting emission spectrum toward the longer wavelengths. The temperature-dependence characteristics of this phosphor are very good.

Following is a specific example for preparing the copper-activated strontium-lutecium phosphate phosphor having additional manganese activator.

Example IV

| Raw-mix constituent: | Amount, grams |
|---|---|
| SrHPO$_4$ (38.6% P$_2$O$_5$—56% SrO) | 367.6 |
| SrCO$_3$ | 72.6 |
| Lu$_2$O$_3$ | 41.08 |
| Copper carbonate (56% Cu) | 2.84 |
| Manganous carbonate (45.1% Mn) | 2.44 |

The foregoing raw-mix constituents are fired under the same conditions as the yttrium-including phosphor described hereinbefore and the firing conditions can be varied considerably if desired, similar to the previous phosphors as described.

All other embodiments of the lutecium-including phosphor can be compounded to correspond to the yttrium-including and gadolinium-including phosphor, including the substitution of other specified alkaline-earth metals for the preferred strontium, the use of the specified amounts of tin activator to replace the copper, either in part or in whole, and the use of the manganese additional activator with the primary tin, copper or tin-copper activators. The curve in FIG. 3 and the dashed curves in FIGS. 4 and 5 establish the phosphor constituent ranges. As further examples, 4.04 grams of stannous oxide can be substituted for the copper carbonate in the foregoing Example IV or copper and tin compounds can be mixed in amount of 1.70 grams copper carbonate and 4.04 grams stannous oxide and substituted for the copper carbonate in Example IV. In any of these embodiments, the manganous carbonate can be eliminated if desired. Also, calcium or barium acid phosphate and carbonate or any mixtures thereof can be substituted either in part or in whole for the corresponding strontium compounds listed under Example IV, maintaining the gram-atom ratios of the phosphor raw-mix constituents the same. By way of further example, if 61.3 grams strontium carbonate, 39.8 grams lutecium oxide and 1.7 grams copper carbonate are substituted in place of the amounts of the corresponding materials as given in Example IV and the manganous carbonate not included, the total metal to phosphorus atom ratio, as per FIG. 3, will be 2.71:2 and the atom ratio of copper to phosphorus will be 0.015:2.

STRONTIUM-YTTERBIUM PHOSPHATE

This phosphor is similar to the previous yttrium- and gadolinium-including phosphors with respect to permissible, preferred and optimum constituent ranges except that ytterbium is substituted for gadolinium for example. The performance of the ytterbium-including phosphor is best when the primary copper activator is supplemented by additional manganese activator. When the phosphor is activated only by copper with no additional manganese activator, the phosphor exhibits an emission under excitation by a full arc which appears yellow-green to the eye and as viewed through a spectroscope, the emission is a continuous band extending from blue to orange. Increasing amounts of additional manganese activator shift the resulting emission spectrum toward the longer wavelengths. The temperature-dependence characteristics of this phosphor are very good.

Following is a specific example for preparing the copper-activated strontium-ytterbium phosphate phosphor having additional manganese activator.

Example V

| Raw-mix constituent: | Amount, grams |
|---|---|
| SrHPO$_4$ (38.6% P$_2$O$_5$—56% SrO) | 367.6 |
| SrCO$_3$ | 72.6 |
| Yb$_2$O$_3$ | 40.68 |
| Copper carbonate (56% Cu) | 2.84 |
| Manganous carbonate (45.1% Mn) | 2.44 |

The foregoing raw-mix constituents are fired under the same conditions as the yttrium-including phosphor described hereinbefore and the firing conditions can be varied considerably if desired, similar to the previous phosphors as described.

All other embodiments of the ytterbium-including phosphor can be compounded to correspond to the yttrium-including and gadolinium-including phosphor, including the substitution of other specified alkaline-earth metals for the preferred strontium, the use of the specified amounts of tin activator to replace the copper, either in part or in whole, and the use of the manganese additional activator with the primary tin, copper or tin-copper activators. The curve in FIG. 3 and the dashed curves in FIGS. 4 and 5 establish the phosphor constituent ranges. As further examples, 4.04 grams of stannous oxide can be substituted for the copper carbonate in the foregoing Example V or copper and tin compounds can be mixed in amount of 1.70 grams copper carbonate and 4.04 grams stannous oxide and substituted for the copper carbonate in Example V. In any of these embodiments, the manganous carbonate can be eliminated if desired. Also, calcium or barium acid phosphate and carbonate or any mixtures thereof can be substituted either in part or in whole for the corresponding strontium compounds listed under Example V, maintaining the gram-atom ratios of the phosphor raw-mix constituents the same. By way of further example, if 61.3 grams trontium carbonate, 39.4 grams ytterbium oxide and 1.7 grams copper carbonate are substituted in place of the amounts of the corresponding materials as given in Example V and the manganous carbonate not included, the total metal to phosphorus atom ratio, as per FIG. 3, will be 2.71:2 and the atom ratio of copper to phosphorus will be 0.015:2.

In any of the foregoing Examples I through V, two or more of the rare earth metals and yttrium can be mixed and used in any relative proportions provided that the ratio of the sum of all atoms of rare earth metals and yttrium to strontium, for example, is from 1:4 to 1:150 with other phosphor constituent ranges maintained as specified. The emission characteristics of the resulting phosphors will be intermediate the emission characteristics of the phosphors which incorporates only one rare earth metal or yttrium phosphate as additive. For example, if a copper-activated phosphor utilizes equal gramatom amounts of additive terbium and yttrium phosphates, the resulting emission spectrum is a combination of the line emission which characterizes the cuprous copper-terbium phosphor and the continuous or band emission which characterizes the cuprous copper-yttrium phosphor.

The performance characteristics of the phosphors as described herein are quite unusual with respect to emission characteristics and temperature-dependence characteristics. If the terbium-including phosphor is activated only by cuprous copper, the resulting emission is a line spectrum. It should be noted that a portion of the terbium may also be acting as an activator, in addition to serving as an additive material. When such a phosphor is activated by stannous tin, however, the resulting emission spectrum is a continuous or band type. When the terbium is replaced by gadolinium as an additive metal and the resulting phosphor is activated only by cuprous copper, the resulting emission displays a continuous spectrum. It is thus apparent that one additional electron in the "N" shell completely modifies the phosphor emission characteristics. In addition, when any of the phosphors as described herein which exhibit a continuous emission spectrum are heated, the peak of emission shifts somewhat toward a shorter wavelength. This is characteristic of nearly all phosphors observed. In the case of the terbium-including embodiment which includes only copper in activator proportions, no shift in the line emission spectrum is observed as the phosphor is heated to higher and higher temperatures.

Some impurities can be tolerated in any of the present phosphor. As an example, limited amounts of rare-earth impurities are apt to be introduced with the terbium oxide or other rare earth compounds as used in the phosphor raw mix. In addition, any of the foregoing phosphors can tolerate other metallic impurities, such as indium for example. The presence of such other metallic impurities will often modify the emission characteristics of the phosphor and in the case of indium, apparently a phosphor is formed which serves as a diluent for the foregoing indicated phosphor of this invention. Also, with a metallic impurity such as indium, apparently som of the indium acts in an amphoteric fashion, thereby increasing the tolerable metal to phosphorus ratio. Other metallic impurities such as zinc can also be tolerated in the phosphor of this invention.

Any of the present phosphors tend to lose some output when heated in an oxidizing atmosphere to an intermediate temperature such as about 650° C. Such temperatures are normally encountered in lehring a coated bulb in order to remove binder material from the coated phosphor and this will cause the phosphor to lose some of its brightness. This difficulty is readily overcome by limiting the temperatures to which the prepared phosphor is exposed to about 550° C. or less. The phosphor can be coated onto the envelope 14 or the member 32 with an electrostatic process or with a boric acid binder, which material can be rendered effective to bond the phosphor to vitreous materials at relatively-low lehring temperatures so that the phosphor output is not impaired.

It will be recognized that the objects of the invention have been achieved by providing phosphor material having excellent temperature-dependence characteristics and a method for making such phosphor. There has also been provided phosphor material having excellent temperature-dependence characteristics and emission colors varying from green to longer visible wavelengths as well as phosphor material having a line emission spectrum and very good luminosity efficiency. There has also been provided a high-pressure, mercury-vapor lamp having an increased output which is color corrected and such a lamp which has a smaller effective light source and increased output.

While best embodiments of the present invention have been illustrated and described in detail, it is to be particularly understood that the invention is not limited thereto or thereby.

I claim:

1. A phosphate phosphor having as essential metallic elements: at least one of the first group consisting of copper and tin, with at least a portion of the elements of said first group present in the cuprous and stannous states respectively; at least one of the second group consisting of strontium, calcium and barium; and at least one of the third group consisting of terbium, yttrium, gadolinium, lutecium and ytterbium; a ratio of the sum of all atoms of the elements of said first group to atoms of phosphorus in said phosphor of from 0.001:2 to 0.10:2, with the ratio of atoms of copper to atoms of phosphorus in said phosphor not exceeding 0.06:2; a ratio of total effective positive valence bonds of the total atoms of metal times 0.5 to total atoms of phosphorus in said phosphor of from 2.2:2 to 3.08:2; and a ratio of all atoms of the elements in said third group to all atoms of the elements in said second group of from 1:4 to 1:150.

2. A phosphor as specified in claim 1, wherein manganese at least a portion of which is in the divalent state is also included in from trace amounts up to such amount that the ratio of atoms of manganese to atoms of phosphorus in said phosphor is 0.16:2.

3. A phosphate phosphor having as essential metallic elements: at least one of the first group consisting of copper and tin, with at least a portion of the elements of said first group present in the cuprous and stannous states respectively; at least one of the second group consisting of strontium, calcium and barium; and at least one of the third group consisting of terbium, yttrium, gadolinium, lutecium and ytterbium; a ratio of the sum of all atoms of the elements of said first group to atoms of phosphorus in said phosphor of from 0.001:2 to 0.10:2, with the ratio of atoms of copper to atoms of phosphorus in said phosphor not exceeding 0.06:2; a ratio of the sum of all atoms of the elements of said third group times 1.5 plus all atoms of the elements of said second group plus atoms of copper times 0.5 plus atoms of tin to atoms of phosphorus in said phosphor of from 2.2:2 to 3.08:2; and a ratio of the sum of all atoms of the elements of said third group to the sum of all atoms of the elements of said second group of from 1:4 to 1:150.

4. A phosphate phosphor having as essential metallic elements: terbium; at least one of the first group consisting of copper and tin, with at least a portion of the elements of said first group present in the cuprous and stannous states respectively; and at least one of the second group consisting of strontium, calcium and barium; a ratio of the sum of all atoms of the elements of said first group to atoms of phosphorus in said phosphor of from 0.001:2 to 0.10:2, with the ratio of atoms of copper to atoms of phosphorus in said phosphor not exceeding 0.06:2; a ratio of the sum of atoms of terbium times 1.5 plus the sum of all atoms of the elements of said second group plus atoms of copper times 0.5 plus atoms of tin to atoms of phosphorus in said phosphor of from 2.2:2 to 3.08:2; and a ratio of atoms of terbium to the sum of all atoms of the elements of said second group of from 1:4 to 1:150.

5. A phosphate phosphor having metallic elements consisting essentially of: terbium; copper, at least a portion of which is present in the cuprous state; and at least one of the group consisting of strontium, calcium and barium; a ratio of atoms of copper to atoms of phosphorus in said phosphor of from 0.001:2 to 0.06:2; a ratio of total atoms of terbium times 1.5 plus total atoms of the elements of said group plus atoms of copper times 0.5 to atoms of phosphorus in said phosphor of from 2.2:2 to 3.08:2; and a ratio of atoms of terbium to total atoms of the elements of said group of from 1:4 to 1:150.

6. A phosphate phosphor having as essential metallic elements terbium, copper and strontium, a ratio of atoms of copper to atoms of phosphorus in said phosphor of from 0.001:2 to 0.06:2, a ratio of atoms of terbium times 1.5 plus atoms of strontium plus atoms of copper times 0.5 to atoms of phosphorus in said phosphor of from 2.2:2 to 3.08:2, and a ratio of atoms of terbium to atoms of strontium of from 1:4 to 1:150, and said phosphor having been fired during preparation in an atmosphere which is at most mildly reactive.

7. A phosphate phosphor having as essential metallic elements terbium, tin and strontium, a ratio of atoms of tin to atoms of phosphorus in said phosphor of from 0.001:2 to 0.10:2, a ratio of atoms of terbium times 1.5 plus atoms of strontium plus atoms of tin to atoms of phosphorus in said phosphor of from 2.2:2 to 3.08:2, and a ratio of atoms of terbium to atoms of strontium of from 1:4 to 1:150, and said phosphor having been fired during preparation in an atomsphere which is at most mildly reactive.

8. A phosphate phosphor having as essential metallic elements terbium, copper and strontium, a ratio of atoms of copper to atoms of phosphorus in said phosphor of from 0.006:2 to 0.035:2, a ratio of the sum of atoms of terbium times 1.5 plus atoms of strontium plus atoms of copper times 0.5 to atoms of phosphorus in said phosphor of from 2.4:2 to 2.96:2, and a ratio of atoms of terbium to atoms of strontium of from 1:6 to 1:35, and said phosphor having been fired during preparation in an atmosphere which is slightly reducing and slightly moist.

9. A strontium-terbium phosphate of generally tertiary orthophosphoric proportions and including copper in activator proportions, a ratio of atoms of copper to atoms of phosphorus in said phosphor of about 0.024:2, a ratio of the sum of atoms of terbium times 1.5 plus atoms of strontium plus atoms of copper times 0.5 to atoms of phosphorus in said phosphor of about 2.8:2, and a ratio of atoms of terbium to atoms of strontium of about 1:12, and at least a portion of said copper being in the cuprous state.

10. A phosphate phosphor having as essential metallic elements: yttrium; at least one of the first group consisting of copper and tin, with at least a portion of the elements of said first group present in the cuprous and stannous states respectively; and at least one of the second group consisting of strontium, calcium and barium; a ratio of all atoms of the elements of said first group to atoms of phosphorus in said phosphor of from 0.001:2 to 0.10:2, with the ratio of atoms of copper to atoms of phosphorus in said phosphor not exceeding 0.06:2; a ratio of total effective positive valence bonds of the total atoms of metal times 0.5 to total atoms of phosphorus in said phosphor of from 2.2:2 to 3.08:2; and a ratio of atoms of yttrium to all atoms of the elements of said second group of from 1:4 to 1:150.

11. A phosphor as specified in claim 10, wherein manganese at least a portion of which is in the divalent state is also included in from trace amounts up to such amount that the ratio of atoms of manganese to atoms of phosphorus in said phosphor is 0.16:2.

12. A phosphate phosphor having as essential metallic elements: yttrium; copper, at least a portion of which is present in the cuprous state; and at least one of the group consisting of strontium, calcium and barium;' a ratio of atoms of copper to atoms of phosphorus in said phosphor of from 0.001:2 to 0.06:2; a ratio of total atoms of yttrium times 1.5 plus total atoms of the elements of said group plus atoms of copper times 0.5 to atoms of phosphorus in said phosphor of from 2.2:2 to 3.08:2; and a ratio of atoms of yttrium to total atoms of the elements of said group of from 1:4 to 1:150.

13. A phosphate phosphor having as essential metallic elements: yttrium; at least one of the first group consisting of copper and copper plus manganese; and at least one of the second group consisting of strontium, calcium and barium; a ratio of all atoms of the elements of said first group to atoms of phosphorus in said phosphor of from 0.001:2 to 0.22:2, with a ratio of atoms of copper to atoms of phosphorus in said phosphor of from 0.001:2 to 0.06:2; a ratio of the sum of atoms of yttrium times 1.5 plus all atoms of the elements of said second group plus atoms of copper times 0.5 plus atoms of manganese to atoms of phosphorus in said phosphor of from 2.2:2 to 3.08:2; and a ratio of atoms of yttrium to atoms of the elements of said second group of from 1:4 to 1:150; and said phosphor having been fired during preparation in an atmosphere which is at most mildly reactive.

14. A phosphate phosphor having metallic elements consisting essentially of yttrium; strontium; and at least one of the group consisting of copper and copper plus manganese; a ratio of all atoms of the elements of said group to atoms of phosphorus in said phosphor of from 0.001:2 to 0.22:2, with the ratio of atoms of copper to atoms of phosphorus in said phosphor from 0.001:2 to 0.06:2; a ratio of the sum of atoms of yttrium times 1.5 plus atoms of strontium plus atoms of copper times 0.5 plus atoms of manganese to atoms of phosphorus in said phosphor of from 2.2:2 to 3.08:2; and a ratio of atoms of yttrium to atoms of strontium of from 1:4 to 1:150; and said phosphor having been fired during preparation in an atmosphere which is at most mildly reactive.

15. A phosphate phosphor having as essential metallic elements: yttrium; strontium; and at least one of the group consisting of copper and copper plus manganese; a ratio of all atoms of the elements of said group to atoms of phosphorus in said phosphor of from 0.006:2 to 0.195:2, with the ratio of atoms of copper to atoms of phosphorus in said phosphor from 0.006 to 0.035:2; a ratio of the sum of atoms of yttrium times 1.5 plus atoms of strontium plus atoms of copper times 0.5 plus atoms of manganese to atoms of phosphorus in said phosphor of from 2.4:2 to 2.96:2; and a ratio of atoms of yttrium to atoms of strontium of from 1:6 to 1:35; and said phosphor having been fired during preparation in an atmosphere which is at most mildly reactive.

16. A strontium-yttrium phosphate of generally tertiary orthophosphate proportions and including copper and manganese in activator proportions, a ratio of atoms of copper to atoms of phosphorus of about 0.024:2, a ratio of atoms of manganese to atoms of phosphorus of from 0.005:2 to 0.06:2, a ratio of atoms of yttrium times 1.5 plus atoms of strontium plus atoms of copper times 0.5 plus atoms of manganese to atoms of phosphorus in said phosphor of about 2.8:2, and a ratio of atoms of yttrium to atoms of strontium of about 1:12, and said phosphor having been fired during preparation in a slightly reducing and slightly moist atmosphere.

17. A phosphate phosphor having as essential metallic elements: gadolinium; at least one of the first group consisting of copper and tin, with at least a portion of the elements of said first group present in the cuprous and stannous states respectively; and at least one of the second group consisting of strontium, calcium and barium; a ratio of all atoms of the elements of said first group to atoms of phosphorus in said phopshor of from 0.001:2 to 0.10:2, with the ratio of atoms of copper to atoms of phosphorus in said phosphor not exceeding 0.06:2; a ratio of total effective positive valence bonds of the total atoms of metal times 0.5 to total atoms of phosphorus in said phosphor of from 2.2:2 to 3.08:2; and a ratio of atoms of gadolinium to all atoms of the elements of said second group of from 1:4 to 1:150.

18. A phosphor as specified in claim 17, wherein manganese at least a portion of which is in the divalent state is also included in from trace amounts up to such amount that the ratio of atoms of manganese to atoms of phosphorus in said phosphor is 0.16:2.

19. A phosphate phosphor having as essential metallic elements: gadolinium; copper, at least a portion of which is present in the cuprous state; and at least one of the group consisting of strontium, calcium and barium; a ratio of total atoms of copper to atoms of phosphorus in said phosphor of from 0.001:2 to 0.06:2; a ratio of total atoms of gadolinium times 1.5 plus total atoms of the elements of said group plus atoms of copper times 0.5 to atoms of phosphorus in said phosphor of from 2.2:2 to 3.08:2; and a ratio of atoms of gadolinium to total atoms of the elements in said group of from 1:4 to 1:150.

20. A phosphate phosphor having metallic elements consisting essentially of: gadolinium; at least one of the first group consisting of copper and copper plus manganese; and at least one of the second group consisting of strontium, calcium and barium; a ratio of all atoms of the elements of said first group to atoms of phosphorus in said phosphor of from 0.001:2 to 0.22:2, with the ratio of atoms of copper to atoms of phosphorus in said phosphor from 0.001:2 to 0.06:2; a ratio of the sum of atoms of gadolinium times 1.5 plus all atoms of the elements of said second group plus atoms of copper times 0.5 plus atoms of manganese to atoms of phosphorus in said phosphor of from 2.2:2 to 3.08:2; and a ratio of atoms of gadolinium to all atoms of the elements of said second group of from 1:4 to 1:150; and said phosphor having been fired during preparation in an atmosphere which is at most mildly reactive.

21. A strontium-gadolinium phosphate of generally tertiary orthophosphate proportions and including copper and manganese in activator proportions, a ratio of atoms of copper to atoms of phosphorus of about 0.24:2, a ratio of atoms of manganese to atoms of phosphorus of from 0.005:2 to 0.06:2, a ratio of atoms of gadolinium times 1.5 plus atoms of strontium plus atoms of copper times 0.5 plus atoms of manganese to atoms of phosphorus in said phosphor of about 2.8:2, and a ratio of atoms of gadolinium to atoms of strontium of about 1:12, and said phosphor having been fired during preparation in a slightly reducing and slightly moist atmosphere.

22. A phosphate phosphor having as essential metallic elements: lutecium; at least one of the first group consisting of copper and tin, with at least a portion of the elements of said first group present in the cuprous and stannous states respectively; and at least one of the second group consisting of strontium, calcium and barium; a ratio of all atoms of the elements of said first group to atoms of phosphorus in said phosphor of from 0.001:2 to 0.10:2, with the ratio of atoms of copper to atoms of phosphorus in said phosphor not exceeding 0.06:2; a ratio of total effective positive valence bonds of the total atoms of metal times 0.5 to total atoms of phosphorus in said phosphor of from 2.2:2 to 3.08:2; and a ratio of atoms of lutecium to all atoms of the elements in said second group of from 1:4 to 1:150.

23. A phosphor as specified in claim 22, wherein manganese at least a portion of which is in the divalent state is also included in from trace amounts up to such amount that the ratio of atoms of manganese to atoms of phosphorus in said phosphor is 0.16:2.

24. A phosphate phosphor having as essential metallic elements: lutecium; copper, at least a portion of which is present in the cuprous state; and at least one of the group consisting of strontium, calcium and barium; a ratio of total atoms of copper to atoms of phosphorus in said phosphor of from 0.001:2 to 0.06:2; a ratio of total atoms of lutecium times 1.5 plus total atoms of the elements of said group plus atoms of copper times 0.5 to atoms of phosphorus in said phosphor of from 2.2:2 to 3.08:2; and a ratio of atoms of lutecium to total atoms of the elements of said group of from 1:4 to 1:150.

25. A phosphate phosphor having metallic elements consisting essentially of: lutecium; at least one of the first group consisting of copper and copper plus manganese; and at least one of the second group consisting of strontium, calcium and barium; a ratio of all atoms of the elements of said first group to atoms of phosphorus in said phosphor of from 0.001:2 to 0.22:2, with the ratio of atoms of copper to atoms of phosphorus in said phosphor from 0.001:2 to 0.06:2; a ratio of the sum of atoms of lutecium times 1.5 plus all atoms of the elements of said second group plus atoms of copper times 0.5 plus atoms of manganese to atoms of phosphorus in said phosphor of from 2.2:2 to 3.08:2; and a ratio of atoms of lutecium to all atoms of the elements of the second group of from 1:4 to 1:150; and said phosphor having been fired during preparation in an atmosphere which is at most mildly reactive.

26. A strontium-lutecium phosphate of generally tertiary orthophosphate proportions and including copper and manganese in activator proportions, a ratio of atoms of copper to atoms of phosphorus of about 0.024:2, a ratio of atoms of manganese to atoms of phosphorus of from 0.005:2 to 0.06:2, a ratio of atoms of lutecium times 1.5 plus atoms of strontium plus atoms of copper times 0.5 plus atoms of manganese to atoms of phosphorus in said phosphor of about 2.8:2, and a ratio of atoms of lutecium to atoms of strontium of about 1:12, and said phosphor having been fired during preparation in a slightly reducing and slightly moist atmosphere.

27. A phosphate phosphor having as essential metallic elements: ytterbium; at least one of the first group consisting of copper and tin, with at least a portion of the elements of said first group present in the cuprous and stannous states respectively; and at least one of the second group consisting of strontium, calcium and barium; a ratio of all atoms of the elements of said first group to atoms of phosphorus in said phosphor of from 0.001:2 to 0.10:2, with the ratio of atoms of copper to atoms of phosphorus in said phosphor not exceeding 0.06:2; a ratio of total effective positive valence bonds of the total atoms of metal times 0.5 to atoms of phosphorus in said phosphor of from 2.2:2 to 3.08:2; and a ratio of atoms of ytterbium to all atoms of the elements of said second group of from 1:4 to 1:150.

28. A phosphor as specified in claim 27, wherein manganese at least a portion of which is in the divalent state is also included in from trace amounts up to such amount that the ratio of atoms of manganese to atoms of phosphorus in said phosphor is 0.16:2.

29. A phosphate phosphor having as essential metallic elements: ytterbium; copper, at least a portion of which is present in the cuprous state; and at least one of the group consisting of strontium, calcium and barium; a ratio of total atoms of copper to atoms of phosphorus in said phosphor of from 0.001:2 to 0.06:2; a ratio of total atoms of ytterbium times 1.5 plus total atoms of the elements of said group plus atoms of copper times 0.5 to atoms of phosphorus in said phosphor of from 2.2:2 to 3.08:2; and a ratio of atoms of ytterbium to total atoms of the elements of said group of from 1:4 to 1:150.

30. A phosphate phosphor having metallic elements consisting essentially of: ytterbium; at least one of the first group consisting of copper and copper plus manganese; and at least one of the second group consisting of strontium, calcium and barium; a ratio of all atoms of the elements of said first group to atoms of phosphorus in said phosphor of from 0.001:2 to 0.22:2, with the ratio of atoms of copper to atoms of phosphorus in said phosphor from 0.001:2 to 0.06:2; a ratio of the sum of atoms of ytterbium times 1.5 plus all atoms of the elements of said second group plus atoms of copper times 0.5 plus atoms of manganese to atoms of phosphorus in said phosphor of from 2.2:2 to 3.08:2; and a ratio of atoms of ytterbium to all atoms of the elements of said second group of from 1:4 to 1:150, and said phosphor having been fired during preparation in an atmosphere which is at most mildly reactive.

31. A strontium-ytterbium phosphate of generally tertiary orthophosphate proportions and including copper and manganese in activator proportions, a ratio of atoms of copper to atoms of phosphorus of about 0.024:2, a ratio of atoms of manganese to atoms of phosphorus of from 0.005:2 to 0.06:2, a ratio of atoms of ytterbium times 1.5 plus atoms of strontium plus atoms of copper times 0.5 plus atoms of manganese to atoms of phosphorus in said phosphor of about 2.8:2, and a ratio of atoms of ytterbium to atoms of strontium of about 1:12, and said phosphor having been fired during preparation in a slightly reducing and slightly moist atmosphere.

32. The method of making phosphate phosphor having as essential metallic elements at least one of the first group consisting of copper and tin; at least one of the second group consisting of terbium, yttrium, gadolinium, lutecium and ytterbium; and at least one of the third group consisting of strontium, calcium and barium; which method comprises: mixing together the necessary ingredients to form the phosphor, with the atom ratio of the elements of the first group, the elements of the second group, the elements of the third group and phosphorus in such mixed ingredients having the following proportions: a ratio of all atoms of the elements of said first group to atoms of phosphorus in said mixture of from 0.001:2 to 0.10:2, with the ratio of atoms of copper to atoms of phosphorus not exceeding 0.06:2; a ratio of the sum of all atoms of the elements of said second group times 1.5 plus all atoms of the elements of said third group plus atoms of copper times 0.5 plus atoms of tin to atoms of phosphorus in said mixture of from 2.2:2 to 3.08:2; and a ratio of all atoms of the elements in said second group to all atoms of the elements in said third group of from 1:4 to 1:150; and firing said mixture in an atmosphere which is at most mildly reactive at a predetermined temperature and for a predetermined time to form said phosphor.

33. The combination which comprises: a power-operable arc tube high-pressure discharge source having the characteristic of emitting ultraviolet radiations and visible radiations; a light-transmitting envelope surrounding said arc-tube source; a radiation-transmitting member positioned intermediate said arc-tube source and said envelope; a phosphate phosphor carried on said radiation-transmitting member; the position of said radiation-transmitting member with respect to said arc-tube source being so selected that when said arc-tube source is operated, said phosphor efficiently converts ultraviolet radiations generated by said arc-tube source into visible radiations; and said phosphor having as essential metallic elements: terbium; copper at least a portion of which is in the cuprous state; and at least one of the group consisting of strontium, calcium and barium; a ratio of atoms of copper to atoms of phosphorus in said phosphor of from 0.001:2 to 0.06:2, a ratio of the sum of atoms of terbium times 1.5 plus all atoms of the elements of said group plus atoms of copper times 0.5 to atoms of phosphorus in said phosphor of from 2.2:2 to 3.08:2; and a ratio of atoms of terbium to all atoms of the elements of said group in said phosphor of from 1:4 to 1:150.

References Cited in the file of this patent
UNITED STATES PATENTS

| | | |
|---|---|---|
| 2,427,728 | Jenkins et al. | Sept. 28, 1947 |
| 2,664,401 | McKeag et al. | Dec. 29, 1953 |
| 2,806,968 | Thorington et al. | Sept. 17, 1957 |